United States Patent [19]

Parham

[11] 4,159,448
[45] Jun. 26, 1979

[54] COMMUNICATION SYSTEMS

[75] Inventor: O. D. Parham, La Habra, Calif.

[73] Assignee: Rath Western Corporation, Janesville, Wis.

[21] Appl. No.: 766,700

[22] Filed: Feb. 8, 1977

[51] Int. Cl.² .............................................. H03K 7/08
[52] U.S. Cl. .................. 325/38 A; 325/142; 332/9 R; 340/167 R
[58] Field of Search ............ 325/38 R, 55, 57, 58, 325/141, 142, 143, 6, 7, 8, 13, 326, 400; 179/15 BA, 15 AW; 343/175, 176, 177, 179, 203, 7 R, 7.5, 17.1 R; 332/9 R, 9 F, 11 R, 12, 15; 329/104, 106, 107, 180; 340/167, 183, 203; 358/144; 330/252, 302, 311

[56] References Cited

U.S. PATENT DOCUMENTS

| | | | |
|---|---|---|---|
| 2,519,083 | 8/1950 | Sutter | 179/15 AW |
| 3,161,829 | 12/1964 | Schulman | 325/143 |
| 3,260,964 | 7/1966 | Whitehead | 179/15 BT |
| 3,274,514 | 9/1966 | Foulger | 325/142 |
| 3,366,881 | 1/1968 | Malone | 325/143 |
| 3,388,214 | 6/1968 | Eilers | 358/144 |
| 3,562,671 | 2/1971 | Honma et al. | 325/143 |
| 3,764,915 | 10/1973 | Cox | 325/55 |
| 3,840,890 | 10/1974 | Sunderland | 325/143 |
| 3,862,363 | 1/1975 | Tanimoto | 179/15 AW |
| 3,872,393 | 3/1975 | Ohsawa | 330/252 |
| 4,058,771 | 11/1977 | Ohsawa | 325/492 |

Primary Examiner—Benedict V. Safourek
Attorney, Agent, or Firm—Grover A. Frater

[57] ABSTRACT

A pulse modulation system in which both ends of the pulses of a train can be modulated in time relative to time marker signals, permits establishment of a four-channel, time division, duplex communication system on a single radio frequency carrier. The modulation technique permits pulse width modulation of signals whose band width exceeds the pulse repetition rate.

Such a system can provide relatively narrow band, low noise, communication, and it is applicable to transmission and reception of high quality stereo signals. Moreover, it can provide private, secure radio communication between two stations, one of which transmits a train of pulses one edge of each of which is unmodulated to form time marker signals. The formation of the other edge of the pulses of the train is modulated in time with some variable information, or data, but only if the pulse train received from the other station has one edge of its pulses modulated with an identification signal. The other edge of the pulses of that other station may be modulated in time or width with variable information.

A practical application of such a communications system is illustrated in a cordless telephone using transceivers using a modulator, demodulator, and amplifier circuitry according to the invention. A second application is illustrated showing how the invention is used to transmit pulse modulated signals whose band width exceeds the pulse repetition rate.

27 Claims, 10 Drawing Figures

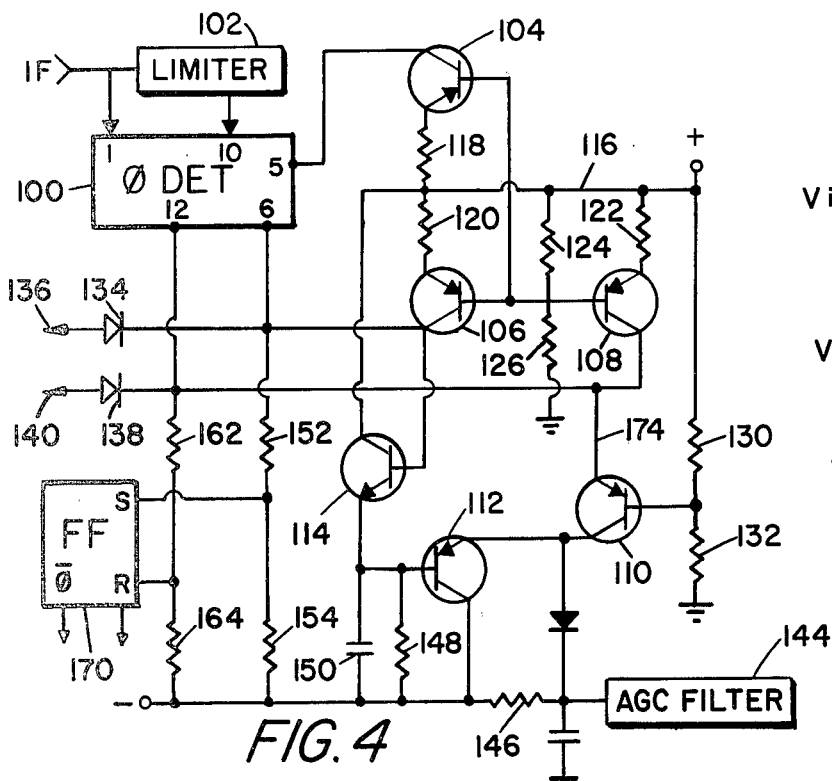
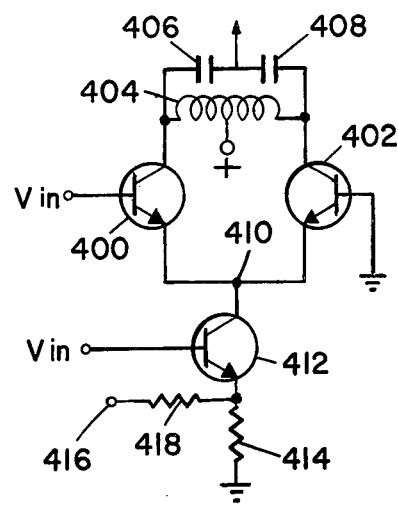
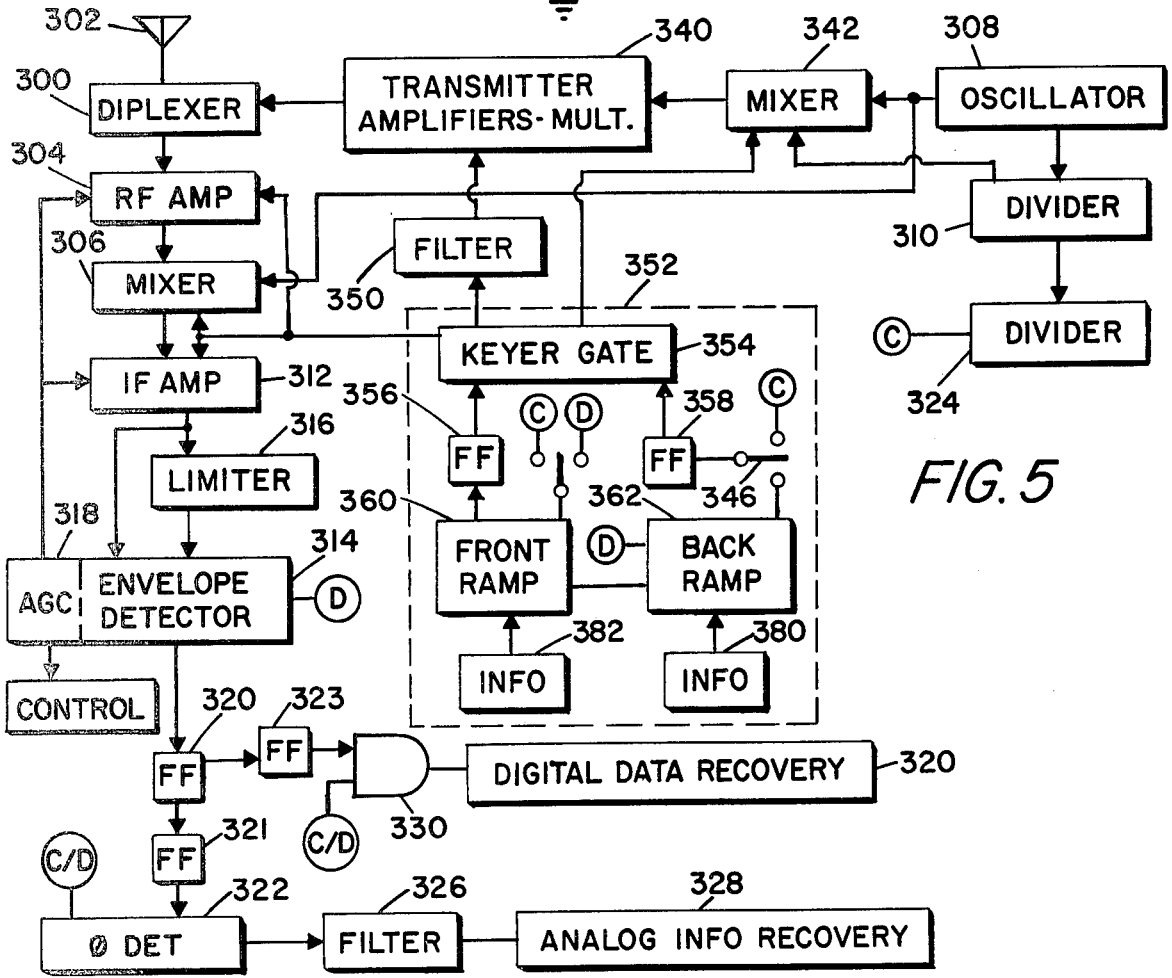
FIG. 4
FIG. 6
FIG. 5

COMMUNICATION SYSTEMS

IMPROVEMENTS IN COMMUNICATION SYSTEMS

This invention relates to improvements in communication systems. It provides a novel modulation method and demodulation method, and it provides novel apparatus for practicing those methods.

The modulation and demodulation methods make it possible to employ security techniques that offer a number of advantages, and the provision of a novel security method and apparatus for practicing the method constitutes an additional facet of the invention applicable both to one-way communication such, for example, as is employed in garage door openers and silent alarms, and to two-way communication. Examples of two-way communication applications include multiple station communication systems for public safety and cordless telephones. In connection with the latter, the invention provides an improved method and means for conducting multiple-way, duplex communication by time division over a single ratio frequency link. That kind of communication presents the problem of isolating transmitted signals from the receiver when located adjacent to the transmitter as in a transceiver, and the invention also provides an improved means for overcoming that difficulty.

BACKGROUND OF THE INVENTION

A number of writers have described communications systems which employ pulse modulation in some form. Intelligence is conveyed in those systems by modulating pulse width or pulse amplitude, or the spacing between pulses, or some other characteristic. However, it appears that the prior art does not include a pulse modulation system which involves modulating pulse width by altering both the time of beginning and the time of ending of individual pulses relative to a standard time.

While the literature does include a description of a communication system which combines pulse modulation with time division multiplexing, it is the pulse rate that is modulated so that only one channel of information is transmitted. In a duplex system employing two stations, each with a receiver and transmitter, the pulse repetition rate of the received signal is used to control the unmodulated pulse repetition rate of the signal transmitted by that station. In such a system, the communications link can be considered to provide two channels of information, although one of them is limited to the transmission of synchronizing information. Further, such a scheme imposes the limitation that the band width of the intelligence transmitted by altering pulse repetition rate must be less than the pulse repetition rate itself.

Prior writers have shown that it is possible to provide a measure of security in the time division multiplexing of pulse rate modulated signals. However, the security aspect depends upon the relation between the pulse repetition rate and the propogation velocity of the signals. As a consequence, signals can be made secure only in the sense that communication is possible only between stations that are separated by a physical distance that corresponds to the pulse repetition rate employed in the communication.

It appears that the prior art does not include any modulation system in which pulse width modulation is accomplished by modulating both the beginning time and the ending time of the same pulse. Since that has not been done, the prior art does not include time-sharing, duplex communications that employ such a pulse width modulation scheme.

SUMMARY OF THE INVENTION

It is an object of this invention to provide a modulation method and a demodulation method that are novel and that provide an unexpected advantage.

It is an object of the invention to provide a novel structure by which that modulation method and demodulation method can be accomplished.

It is an object to provide a communication system that incorporates an improved identification and security function. It is an object to provide an improved transceiver capable of time-sharing, duplex operation.

It is another object to provide a system of pulse width modulation in which the band width of the modulation signal may exceed the pulse repetition rate, which provides more information channels in a single communications link, and which is useful for transmitting stereo signals.

It is another object to provide a means for isolating the receiver channel from transmitting channels on adjacent frequencies which means is useful in such transceiver and which also has general utility.

It is a further object to provide an improved frequency selective amplifier.

The invention employs pulse width modulation. Demodulation is accomplished by comparing the time of the occurence of the leading or the lagging edge of the pulse with a time marking signal which is made available at each of the stations in a communications link. That marking signal can be generated at one of the stations and transmitted to the others, or it can be transmitted to those stations from a point outside the link.

In one preferred system, marker signals are generated at one of the stations in the communications link (a base station) and are transmitted to the other stations (remote transmitting stations) as one edge of each of the pulses in the train of pulses emanating from the base station. The time of the other edge of each of those pulses of the train can be altered in accordance with some intelligence to be transmitted so that the effect is to modulate the width of the pulses of the train in accordance with that intelligence.

If the time marking pulse is transmitted separately, or is available from another source, then both edges of each pulse of the train can be modulated to afford two channels of intelligence transmission. It is required only that the time of formation of the edges of the pulse be compared with the time marking signal, or some signal derived therefrom, to accomplish the modulation.

When the modulation system is applied to the cordless telephone application it is preferred that communication between the two telephones, one a remote unit and the other a base unit, be accomplished on a single carrier frequency. The pulses transmitted from the base station to the remote station, and from the remote station to the base station, comprise bursts of radio frequency energy, and both stations may operate on a common radio frequency. The base station pulses are modulated at one edge such, for example, as the forward edge. Thus, in one arrangement, the forward edge is modulated with ring signal information and remote station identification information prior to establishment of the radio link. After the link is established, that forward edge of the pulse is modulated instead with the audio signal arriving at the base station from the telephone line. In transmissions from the remote station, one edge of the transmitted pulse may contain information identifying the remote station. A voice signal to be applied to the telephone line from the remote is used to modulate the other edge of the pulse transmitted by the remote station.

In such a cordless telephone system, each station comprises a transceiver. In a typical system, communication is conducted at a carrier frequency near 50 mHz. Information pulses are formed at a rate of about 3 kHz and, in the case of a communications link between a base station and only one remote station, the pulse width is a little less than half a cycle long at the pulse repetition rate. Each pulse comprises a burst of radio frequency energy containing about several thousand cycles of the radio frequency carrier signal. Modulation is applied by delaying the start of the pulse for a time and by delaying, for a time, a signal effective to terminate the pulse.

In the preferred form of the invention, the time marker signal initiates generation of a ramp signal which controls operation of a flip-flop such that the flip-flop changes state when the ramp voltage, or current, reaches a given magnitude. The intelligence that is to be superimposed upon the pulse is made to change the slope of the ramp signal whereby to alter the interval from the time when the ramp signal is initiated to the time when the flip-flop changes state.

In the preferred form of the invention, the time marker signal, or the initiating signal that is derived therefrom, initiates generation of a second ramp function at a lesser slope. When the second ramp function reaches a given magnitude the flip-flop is made to revert back to its initial state thus to terminate generation of the pulse.

The slope of the second ramp function is altered to change the time at which the flip-flop is made to revert back to a state whereby the pulse is terminated in accordance with other information. Thus it is that both the leading edge and the trailing edge of a pulse of radio frequency energy can be altered in time relative to a time marker signal to convey two pieces of information or, to use more conventional terminology, to form two channels for information transmission.

In the embodiment selected for illustration in the accompanying drawing, the forward edge of the pulses formed from the remote station are used for the transmission of voice signals, and the trailing edge of those pulses is used for the transmission of coded data that identifies the remote station from which the pulse is transmitted. In that embodiment, the pulses transmitted by the base station have their trailing edges separated in time by a fixed, or at least by a predetermined interval, so that the trailing edge of the pulses emanating from the base station serve as the time marker signals. They are used directly as time marker signals or to generate signals that serve as timing signals, or time marker signals in both the remote and the base unit. The leading edge of the pulses transmitted by the base station are modulated with voice signals after the communication link has been transmitted, and are modulated with what corresponds to telephone ring signals and remote station identifying signals prior to the time that the communication link between the two stations is established.

The arrangement described is merely an example. It will be apparent that the information impressed on the leading and trailing edge of the pulses can be reversed. It will be apparent that either or both pulse edges may be modulated with analog or digital information. It will be apparent that both edges of the pulses emanating from both of the stations can be modulated if separate time marker signals are sent from one station or the other or from a third station, such as station WWV operated by the National Bureau of Standards. It will also be apparent that additional channels of information can be established by amplitude modulating or frequency modulating the carrier wave that is turned on and off to form the pulses. Recovery of information in those channels is accomplished by the simple expedient of applying an amplitude modulation detector, or a frequency discriminator, at the receiving station.

The variations that are possible in practicing the invention will be more readily understood upon an examination of the specific example of the invention that is described in the accompanying drawings and discussed in the detailed description of the embodiment shown in those drawings.

In one selected example, the invention is applied to a cordless telephone. In another example, the invention is applied to the transmission of voice signals having a band width less than the pulse repetition rate of the pulses that are modulated by those signals. The form of the invention to be described constitutes what is now believed to be the best mode of practicing the invention. It is to be understood that various modifications of the embodiment are possible, and that the scope of the invention is to be measured not merely by that embodiment, but by the scope of the appended claims.

IN THE DRAWINGS:

FIG. 4 is a diagram of the envelope detector portion of a demodulator which embodies the invention and which is useful in accomplishing a demodulation method of the invention;

FIG. 5 is a block diagram of a transceiver which embodies the invention;

FIG. 6 is a diagram of a frequency selective amplifier circuit which embodies the invention;

DESCRIPTION OF PREFERRED EMBODIMENTS

Pulse Width Modulation

The invention permits the transmission of information between two or more stations using pulse width modulation. Unless they are available at both stations from another source, one station transmits a sequence of time marking signals. In the preferred form of the invention, the interval between successive signals is uniform. However, in systems where greater security is required, it is possible to alter the interval between marking signals according to some preestablished plan if all of the stations in the communications link are programmed to recognize and adhere to that plan.

In the preferred form of the invention herein provided, the time marking signals are transmitted as part of a sequence of pulses. One station transmits a train of pulses. The time interval between the leading edges, or the trailing edges, of successive pulses is preestablished, and that interval serves to coordinate the modulation and demodulation processes in that one station and in the stations with which it communicates. To facilitate description of the process, that one station is here called the "base station." Stations in communication with the base station, whose modulation and/or demodulation processes are controlled by signals marking that interval and here called "remote transmitting stations" or simply "remote stations" or "transmitting stations."

Figure 1:
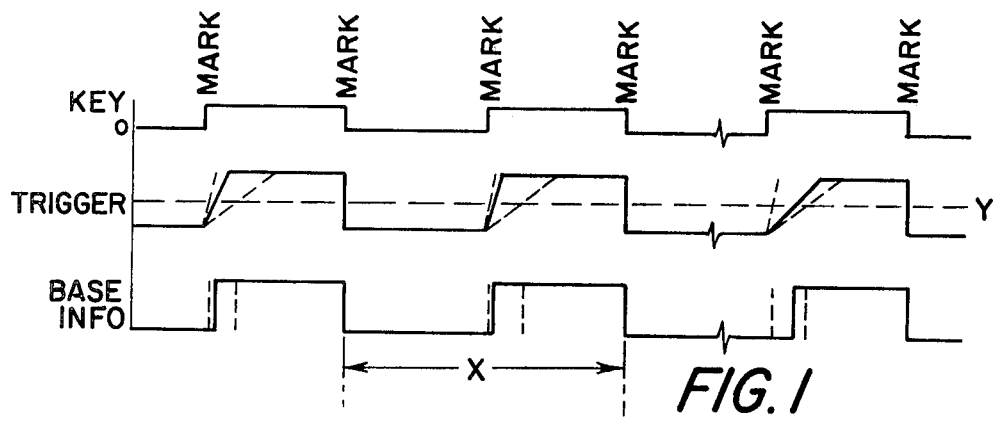
FIG. 1 is a graph illustrating the modulation process according to the invention as it is accomplished at a base station.

Let it be supposed that the base station includes a crystal oscillator or other structure which generates an alternating signal or a pulsed signal at a fixed frequency. The series of square waves depicted on line "key" in FIG. 1 is such a signal. The interval between the leading edges of successive pulses is uniform. So is the interval between successive trailing edges. Either the leading edge or the trailing edge may be selected as the time marker signal.

The time marker signal is used as the time reference. It may be used directly, but in a practical application it would ordinarily be used to generate other timing signals which are coherent in time or which are separated by a fixed time from an original marker signal. In addition, it is possible to use marker signals that are generated at harmonics and sub-harmonics of the marker signal frequency. For the purpose of this specification, any signal which is employed as a time marker and has a preestablished time relationship to the original time marker signal is here called a "time marker signal" or a "pulse initiating signal."

The time marker signal is made to initiate generation of a "base station information pulse" in a structure whose effectiveness to create the leading edge of the base station information pulse is controlled by a trigger signal representing information with which the pulse is to be modulated in width. The effectiveness of that same structure to create the trailing edge of the base information pulse is controlled by a time marker signal. For example, time marker signals set a flip-flop so that it changes state when a trigger signal has attained a given amplitude. The flip-flop reverts to original state upon the occurence of another time marker signal. If the trigger signal is one whose amplitude and rising slope varies with time in accordance with some information, then the result is a series of pulses at the flip-flop output the trailing edges of which are spaced uniformly in time and the occurence of the leading edges of which will vary in time from the occurence of a time marker signal by an amount corresponding to the information in the trigger signals. That is illustrated in FIG. 1 where the horizontal dashed line Y represents the level of trigger signal at which the flip-flop will change state. The pulses in the bottom line of FIG. 1 have been pulse width modulated to include the information represented by the slope of the trigger signal.

If the base station information pulse is transmitted to a remote station, two channels for information have been established. One channel, channel 1, is represented by the width of the base station information pulses. The other channel, channel 2, is represented by the fact that there is a pulse and by the time of the trailing edges of the base station information pulses.

Channel 2 conveys time reference information useful to control operation, modulation and demodulation at remote transmitting stations.

Channel 1 is available for the transmission of other information. In the case of a cordless telephone system, channel 1 is available for the transmission of signals simulating telephone ring signals from the base station to remote transmitting stations and, after a communication link between the two stations is established and the hook switch of the telephone is actuated, it is available for transmitting voice from the telephone line to remote cordless telephones.

One way in which trigger signals are developed is to generate a ramp voltage, or current wave form, in a circuit effective to alter the slope of the ramp as a function of the amplitude of an information signal such as a voice signal, or as the function of digital signals. In the case of a digital signal, the ramp has one slope when the digital signal is low and another slope when the digital signal to be represented is high. Thus, each pulse is modulated to include one bit of information.

Next, let it be assumed that two ramp voltage or current generators are provided so that one has a basic slope less than that of the other and so that the slope of each is variable with the magnitude of a respectively associated information signal.

Figure 2:
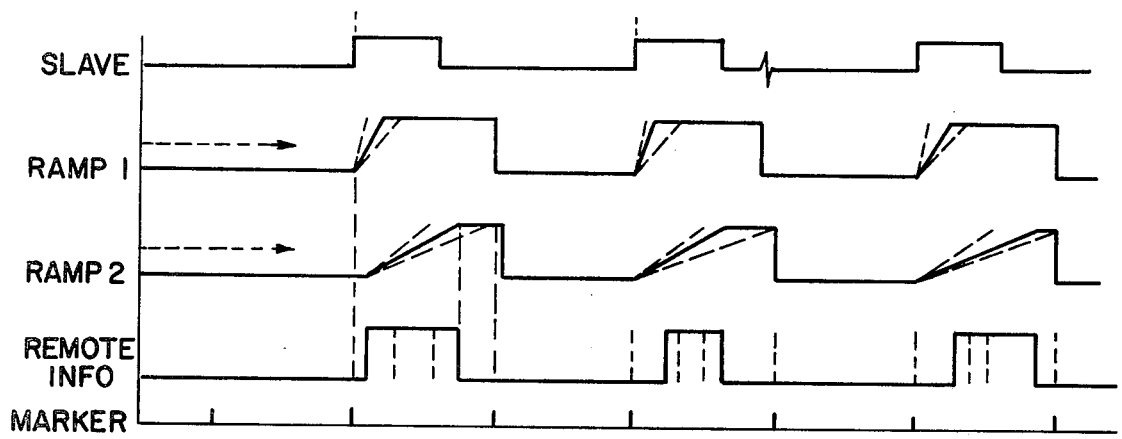
FIG. 2 is a graph illustrating the modulation process according to the invention as it is accomplished at a remote transmitting station.

Let it also be assumed that those two slope generators are connected, one to change the state of a flip-flop, and the other to return that same flip-flop to original state. Such an arrangement can be used to generate pulse trains in which the times of occurence of leading edges are modulated in accordance with the information in one of those information signals and in which the times of occurence of trailing edges are modulated in accordance with the information in the other of those information signals. That process is depicted in FIG. 2. It is assumed that the rectangular waves in the upper "remote" time pulse line of FIG. 2 are generated in a remote transmitting station and that those waves are to be reproduced in a form that is pulse width modulated at both ends. The leading edge of the rectangular waves in the remote time pulse line initiates operation of two ramp generators which generate the wave forms shown on lines "RAMP 1" and "RAMP 2", respectively. Dotted lines represent that range through which slope can be changed by information signals. The two ramp waves are used to generate, one to start and the other to end, a remote station information pulse which is time modulated at both edges.

Construction lines have been drawn from FIGS. 1 and 2 to illustrate that the leading edge of the remote time marker wave form at the remote station is coherent in time with the trailing edge of the base station information pulse that is received by the remote station. Such coherence can be achieved easily after receiving the base station information pulse at the remote station by using its trailing edge to initiate a slave time pulse in the remote station. The duration of the slave pulse is not critical. In the application to be described hereafter, the pulses are formed of bursts of radio frequency energy. The base station and the remote station signals are transmitted on a signal frequency, and, in that case, the base station and remote station transmit their pulses alternately, and the pulse from one station must end before the pulse on the other station can begin. The time of ending the remote station information pulse is controlled by the ramp 2 wave form. It will be apparent that the remote station information pulses are sandwiched in time between base station information pulses. The base and remote station pulses can be transmitted over a single wire line or a light link, or on a single carrier frequency radio link. The fact that information can be contained in the time of initiation of the remote station information pulses provides a third communication channel, channel 3. The fact that information can be contained in the time of ending of the remote station information pulses provides a fourth channel, channel 4.

To utilize those four channels in a wireless radio link, it is necessary only to send a carrier signal from the base to the remote station for the duration of the base station information pulses, and to send a carrier signal from the remote to the base station for the duration of the remote station information pulse.

One of the advantages of the invention is that four channels of information can be transmitted on a single frequency radio link. Communication of the kind here described would be characterized as time division, duplex communication. Further, it is only necessary to modulate the carrier at the remote station and at the base station in other modulation modes to increase the system capacity to include additional information channels.

Figure 3:
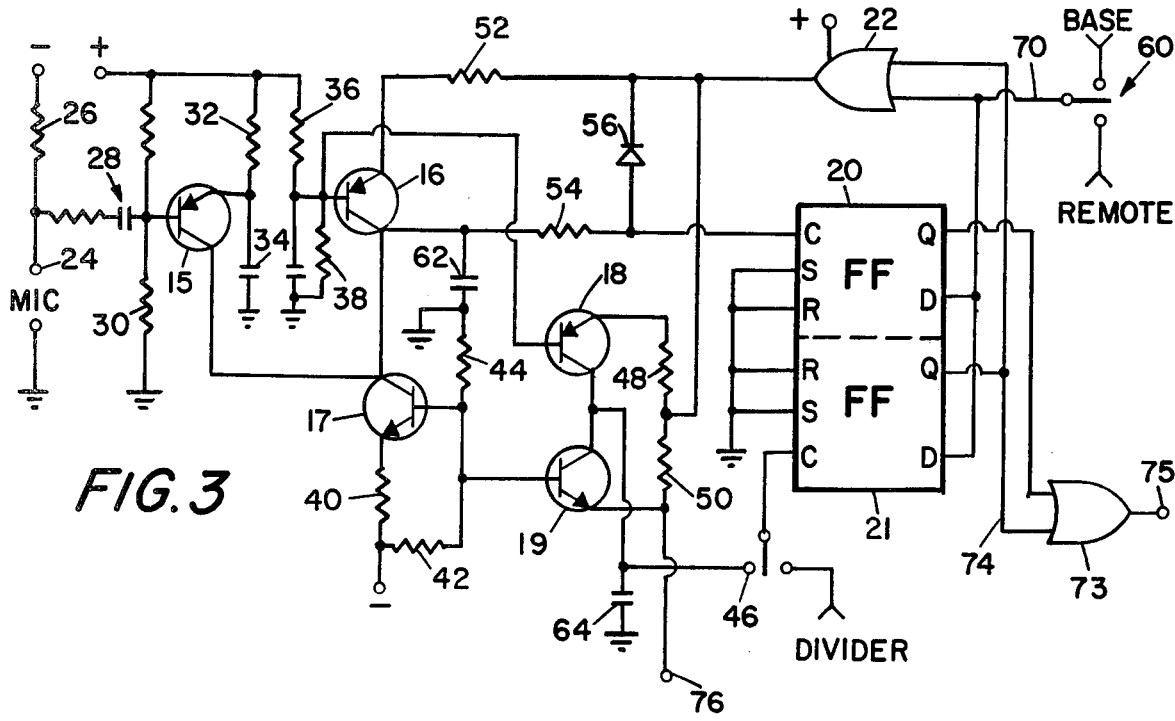
FIG. 3 is a diagram of a modulator which embodies the invention and is capable of practicing the modulation method of the invention.

An apparatus capable of accomplishing modulation of the kind depicted in FIGS. 1 and 2 is shown in FIG. 3. The circuit includes transistors 15, 16, 17, 18, and 19. It includes two type-D flip-flops 20 and 21. It also includes exclusive OR gates 22 and 23. The microphone 24 is connected in series with a resistor 26 between a negative voltage and ground. The junction between the microphone and the resistor 26 is connected through a coupling network 28 to the base of PNP transistor 15. Bias for the transistor is provided by a voltage divider network consisting of resistors 28 and 30 which are connected between the positive supply source and ground. The base of the transistor is connected to the junction between the two resistors. The transistor has its emitter connected to the positive source through a resistor 32 and to ground through a by-pass capacitor 34. The base of PNP transistor 16 is connected to the junction between two resistors 36 and 38 which form a voltage divider network from the positive source to ground. That same voltage divider network supplies bias to the base of PNP transistor 18. The collector of transistor 15 is connected to the collector of transistor 16 and to the collector of NPN transistor 17 whose emitter is connected through a resistor 40 to the negative supply terminal. The base of transistor 17 is connected in a voltage divider which extends from the neagtive supply to ground through resistors 42 and 44. That same voltage divider provides bias for the base of NPN transistor 19 which is connected to the base of transistor 17 at the junction between the two resistors 42 and 44.

The collectors of transistors 18 and 19 are connected together to one of the fixed contacts of a single pole, double throw switch 46. The emitter of transistor 18 is connected through a resistor 48 to the output of exclusive OR gate 22. Similarly, the emitter of transistor 19 is connected through a resistor 50 to the output of that OR gate. The emitter of transistor 16 is connected to the output of the same OR gate through a resistor 52.

The collectors of transistors 15, 16, and 17 are all connected to the output of exclusive OR gate 22 through the series combination of resistor 54 and a diode 56. The junction between that resistor and the diode is connected to the clock input of flip-flop 20. The pole of the switch 46 is connected to the clock input of flip-flop 21, and the other fixed contact of the switch 46 is arranged for connection to a divider circuit from whence a time marker signal can be derived.

The set and reset connections of both flip-flops are grounded. The Q output of flip-flop 20 is connected to one input of exclusive OR gate 23. The Q output of the other flip-flop 21 is connected to the other input of exclusive OR gate 23 and to one of the inputs of exclusive OR gate 22. The other input of exclusive OR gate 22 is connected to the preset, or D, input terminals of both flip-flops, and to the pole of a single pole, double throw switch 60.

There are two ramp generators in the circuit. The ramp signals they generate have different slopes. The ramp wave formed with the steeper slope is formed by the combination of resistor 54 and a capacitor 62 which is connected from the collectors of transistors 15, 16, and 17 to ground. The other ramp generator has a lesser slope. It comprises a capacitor 64 which is connected from the collectors of transistors 18 and 19 to ground and is charged through those transistors and resistors 48 and 50.

The circuit shown in FIG. 3 is intended for incorporation in a cordless telephone unit to be described below. It is used both in the base unit of that telephone system and in the remote transmitter or remote telephone of the system. When the circuit is used in the base unit, switch 46 is thrown to the right to connect the clock input of flip-flop 21 to the divider line on which time marker signals are made to appear. When switch 60 is thrown to the upper position in FIG. 3, it is connected to a source of time marker signals in a base unit. When the circuit shown in FIG. 3 is used in the remote telephone unit, switch 46 is thrown to the left so that the clock input of flip-flop 21 will be subjected to the voltage across capacitor 64. Switch 60 is thrown downwardly in the remote unit and to a source of time marker signals in that remote unit.

Thus it is that time marker signals are applied to line 70 and to the preset D inputs of the two flip-flops whether the switch is connected to the base unit or to the remote unit. There is a difference, however. Time marker signals supplied by the remote unit occur at a time substantially mid-way between marker signals supplied from the base unit. The marker signals are thus arranged because the two units transmit their output pulses alternately in succession.

In the description of FIG. 2, it was assumed that the leading edges of the pulse are formed by changing the state of a flip-flop from one state to another, and the lagging edges are formed by reversing that state. In FIG. 3, that same result is accomplished by using flip-flops and the exclusive OR gate 23. The exclusive OR provides a high output only if its inputs are held at different states. If it is assumed that both flip-flops are arranged to provide a low at the two Q outputs, then the inputs to the gate 23 will be the same and its output will be low. A clock signal is applied to flip-flop 20 before the clock signal is applied to flip-flop 21. Thus, as soon as the clock signal is received at flip-flop 20 it will change state and its Q output will go high. The inputs of OR gate 23 are now different and its output will go high. Subsequently, a clock signal is received at the clock terminal of flip-flop 21, and its Q output changes state to the end that the two inputs of the OR gate 23 are the same. As a consequence, the output of the gate 23 will go low.

Flip-flops 20 and 21 are clocked by positive going signals, and each is clocked at the time when the signal applied to it reaches a given voltage magnitude. The circuit includes two clock signal generators, one for each of the two flip-flops. In this circuit, two ramp voltage wave form generators are used as the clock signal generators. One ramp wave form generator is formed by transistors 15, 16, and 17, and capacitor 62. The other ramp generator comprises transistors 18 and 19, capacitor 64, and data input terminal 76. Capacitor 62 charges more rapidly than does capacitor 64. Since the voltage across capacitor 62 is applied to the clock input of flip-flop 20, that flip-flop controls the front edge modulation of information pulses. Capacitor 64, which charges more slowly, is connected to the clock input of flip-flop 21 (in remote units) so that the voltage across the capacitor 64 and flip-flop 21 control formation of the trailing edge of remote station information pulses. Charging of the capacitors is initiated when the exclusive OR gate 22 is turned on by a time marker signal applied to line 70 at the switch 60. Turning on of the exclusive OR gate has the effect of connecting transistors 16, 18, and 19 to a source of supply. Capacitor 62 is charged from the collectors of transistors 15, 16 and 17. The amount of current that flows at the collector of transistor 15 depends upon the amplitude of the signal supplied to it from microphone 24. Thus, the charging rate and the slope of the ramp voltage that is developed across capacitor 62 is a function of the audio signal amplitude at the microphone 24. The charging rate of capacitor 64 and therefore the slope of the ramp voltage generated across that capacitor depends upon whether a low or a high signal appears at terminal 76. The slope of the voltage that is developed across capacitor 64 is different when a high is applied to terminal 76 that when a low signal is applied to that terminal. Thus it is, when the circuit of FIG. 3 is used as a remote station modulator and switch 46 is thrown to connect capacitor 64 to the clock input terminal of transistor 21, that the Q outputs of flip-flops 20 and 21 change state to generate pulses at the output terminal 75 of exclusive OR gate 23. The leading edge of those pulses is modulated in accordance with the audio signal applied to microphone 24 and the trailing edge is modulated in accordance with digital data applied to terminal 76.

When the modulator is used in a base station, the trailing edges of the pulse train that appears at terminal 75 are to be unmodulated. They are to be uniformly spaced, and that is accomplished by actuating switch 46 so that the clock terminal of flip-flop 21 is connected instead to the output of a divider whose input signal is derived from the internal master oscillator of the base station.

DEMODULATION

A communications link utilizing such pulse width modulation requires a method and a means for demodulation of the pulses sent from one station to the other. Demodulation of the timing and control information in channel 2 is easily accomplished. The fact that there is a carrier signal is easily detected and is made to generate an automatic gain control of AGC voltage. The presence or absence of that voltage may be used to accomplish control functions. The occurrence of the fixed end of the base station pulse, the trailing edge in the example above can be used to develop marker signals in the base unit and remote timing pulses marker signals in other stations. It can be expected that the leading and trailing edges of the pulse will not be exactly square after it has been received at a remote station and processed through the initial stages of its receiver. Nonetheless, a number of techniques are available to detect the time of the leading edge, and the time of the trailing edge, of the information pulse. A combination of flip-flops and large automatic gain control signals can do the job very effectively. A preferred demodulation technique in which the information pulse is reconstructed in an envelope detector is described below.

At this point, it is enough to understand that the pulse envelope can be reconstructed. Thereafter, demodulation of the pulse width modulation on channels 1, 3, and 4 requires only a comparison with a time marker signal of the time of occurrence of the leading edge of the reconstructed base station pulse envelope, and a comparison with a time marker signal of the time of occurrence of the leading and trailing edges of the reconstructed remote station pulse envelope. The marker signals are used to reconstruct, or simulate, the key wave form or remote timing wave form in the unit from whence the pulse was transmitted. That reconstructed pulse and the reconstructed modulated pulse envelope are applied simultaneously to a phase comparator such, for example, as an exclusive OR gate. The output of such a gate is high when the inputs to the gate are different. There is an output from such a detector only during that period, at the beginning of the pulse, or at its end, when the key or remote pulse is present at the input while the modulated pulse is not present.

Separation of the modulation at the leading edge of the pulse from the modulation at the trailing edge of the pulse is facilitated by the fact that the signal is rising at the leading edge and is falling at the trailing edge of the pulse. A combination of edge clocked, D type flip-flops and inverters is capable of separating the two demodulated signals. When the demodulated signal is digital in form, information recovery is accomplished by applying that digital information to digital decoders. When the output of the demodulator is an analog signal, the signal is filtered to remove frequency components outside the range of the frequency components contained in the original information that the signal represents. Thus, for example, where the leading edge of the pulse is modulated with voice information, the output of the leading edge of the phase difference detector is filtered to remove all but the audio frequency components and the signal remaining is applied to an earphone or a speaker.

Reconstruction of the information pulse that is transmitted from one unit of a system to another is readily accomplished in a double balanced or ring modulator. The pulse has the form of a burst of radio frequency energy when it is received at the remote station. There, the signal is amplified. It is mixed with a local oscillator signal to provide an output at an intermediate frequency. The intermediate frequency signal is amplified and is then applied to a double balanced modulator. The intermediate frequency signal is applied to both inputs of the modulator. The signal-to-noise ratio can be improved by connecting the signal to one input through a limiter circuit, and in the preferred form of the invention, a tuned, hard limiter is employed. The output of the balanced modulator is applied to a comparator circuit in which the envelope of the pulse is reconstructed.

A preferred circuit is shown in FIG. 4. It comprises a phase detector 100 which is a balanced modulator such, for example, as the Motorola Integrated Circuit Unit #1496. The input terminals of that unit are numbered 1 and 10. An intermediate frequency signal containing the pulse modulation information is applied to one of those terminals directly and is applied to the other terminal through a limiter and tuned filter 102.

The output terminals are numbered 6 and 12. A current is supplied to terminal 5. The current that flows into terminal 5 causes current of the same magnitude and direction to flow into terminals 6 and 12. Those currents are all equal in the absence of an IF signal.

The unit also includes PNP transistors 104, 106, 108, 110, and 112. The circuit includes one NPN transistor 114. The positive power supply terminal is connected to line 116 and to the emitter of transistor 104 through a resistor 118. The emitter of transistor 106 is connected to line 116 through a resistor 120. The emitter of transistor 108 is connected to line 116 through a resistor 122. The collector of transistor 114 is connected to line 116. The base of transistors 104, 106, and 108 all connect to a point intermediate resistors 124 and 126 which form a voltage divider that extends from line 116 to ground. The base of transistor 110 is connected to a point intermediate resistors 130 and 132 in a voltage divider that extends from line 116 to ground. The collector of transistor 106 is connected to the base of transistor 114 and to the output terminal 6 of the phase detector and through a diode 134 to an output terminal 136. The collector of transistor 108 is connected to the emitter of transistor 110 and to output terminal 12 of the phase detector and through a back biased diode 138 to an output terminal 140. The collector of transistor 110 is connected to the emitter of transistor 112 and it is also connected to the input of an automatic gain control filter unit 144. An input resistor 146 is connected from the input of the AGC filter to the negative supply terminal. The emitter of transistor 112 is also connected to the input of the AGC filter. The emitter of transistor 114 and the base of transistor 112 are connected to the negative supply terminal through a resistor 148. A capacitor 150 is connected in parallel with that resistor 148. There is a voltage divider comprising resistors 152 and 154 connected from the phase detector terminal 6 to the negative supply voltage. The tap of that voltage divider is connected to the set terminals of flip-flops 170. Another voltage divider is connected from terminal 12 of the phase detector to the negative supply terminal. It comprises resistors 162 and 164. The tap between them is connected to the reset terminal, R, of the flip-flop.

The double balanced modulator 100 will operate either as a modulator or as a phase detector. Here, it is used as the latter. It is entirely conventional and is shown as a block in FIG. 4 for simplicity. The remainder of this circuit is embraced by but does not limit the invention. Transistors 104, 106, and 108 are arranged so that the bias to which they are subjected depends upon the relative values of resistors 118, 120, and 122. Current in those three transistors will increase and decrease with source voltage, but the relative values of the current will remain unchanged. That is important because the collectors of transistors 104, 106, and 108 are connected to pins 5, 6, and 12, respectively, of the phase detector. The current at pin 6 and the current at pin 12 are equal to one another, and to the current entering at pin 5 when the input signal to the phase detector is zero. When an intermediate frequency signal is applied at the input terminals 1 and 10 of the phase detector, the current entering at pins 6 and 12 will change. One will increase and the other will decrease, and the amount of that increase and decrease is a function of the amplitude of the difference in the voltages applied to input terminals 1 and 10. While the inputs are derived from the same source, the intermediate frequency signal of the receiver, that signal is applied to one terminal through a limiter. It is applied directly to the other terminal so the effective voltage input to the phase detector is the amount by which the direct signal exceeds the limited signal. There can be a difference only when there is a signal. Therefor, the phase detector 100 provides an output at its terminals 6 and 12 when there is a burst of intermediate frequency energy at the input, and it provides zero output when there is no intermediate frequency signal input. Consequently, an output will appear at terminals 6 and 12 each time that a pulse of energy is received from the transmitting station, and the signal will begin at the time of beginning of the input pulse and it will end at the time of ending of that input pulse.

The signal output at pins 6 and 12 of the phase detector appear as unbalanced currents. The function of transistors 106 and 114 and 108 and 110 is to provide a voltage polarity change when the current unbalance reaches some given magnitude threshold.

The current in transistors 106 and 108 does not change with the change in IF signal amplitude. Their current levels are fixed by the relative values of the bias resistors and the voltage at the positive supply terminal. Ordinarily, the current that flows from the collector of transistor 106 is greater than the current that flows into the pin 6 of the phase detector. Thus, transistor 106 is saturated. The opposite is true in the case of phase detector pin 12 and transistor 108. The current that flows from the collector of transistor 108 is less than the current that flows into the pin 12. Thus, the semi-conductor device inside the phase detector at pin 12 is saturated. Now, let it be assumed that an intermediate frequency signal is applied to the input terminal, and that that signal is rising in amplitude. The current will increase in one of pins 6 and 12, and it will decrease in the other of those pins. Which increases and which decreases depends upon how the input signal is applied to pins 1 and 10. If the change is such as to increase the current at pin 6 and to decrease the current at pin 12, then the current at pin 6 will approach the current flowing from the collector of transistor 106. The current at pin 12 will decrease so that its magnitude approaches the current flowing from the collector at transistor 108. When the currents at pin 6 and transistor 106 change enough so that the current at pin 6 exceeds the current at transistor 106, then the voltage at the collector of transistor 106 goes from high to low. The voltage changes sign from positive to negative. The reverse occurs at the connection of pin 12 and at the collector of transistor 108. When the current in pin 12 is increased to the level of the current in transistor 108, the sign of the voltage at the collector of transistor 108 changes from negative to positive.

Pins 6 and 12 of the phase detector are connected to terminals 136 and 140, respectively, through isolating diodes 134 and 138. The signals that appear at terminals 136 and 140 are used as keying signals. Thus, in a transceiver, the signal at terminal 136 can be used to key the transmitting circuits, and the one at terminal 140 can be used to key the receiver circuits.

Pin 6 of the phase detector is connected at one end of a voltage divider comprising resistors 152 and 154. The junction between those resistors is connected to the set terminal 160 and to the set terminal of a flip-flop 170. Terminal 12 of the phase detector is connected to one end of a voltage divider that extends to the negative supply terminal and includes resistors 162 and 164. The junction between those resistors is connected to an output terminal 166 and to the reset terminal of the flip-flop 170. Flip-flop 170 serves to provide further shaping to the reconstructed information pulse, and it provides output pulses at its Q and Q̄ output terminals. The output from those two terminals are applied to further demodulators in which analog and digital data can be recovered. That is illustrated in FIG. 5.

However, before turning to FIG. 5, it is observed that when the voltage at the collector of transistor 106 changes as a consequence of a receipt of an input pulse at the phase detector, the voltage at the base of transistor −12 will change at the time constant of capacitor 150 and resistor 148. The effect is to produce voltage pulses across resistor 146 which have a constant time width less than the time width of the intermediate frequency input signal pulse. The voltage across that resistor is applied to the input of the AGC filter 144. As a consequence, the magnitude of the automatic gain control voltage at the output of the AGC filter is independent of the intermediate frequency input signal pulse width. On the other hand, since the magnitude of the currents of the phase detector circuit depend upon signal magnitude, the AGC voltage does vary with signal amplitude.

Summarizing, the output of the AGC filter is a voltage which varies with the amplitude of the received signal, but which does not vary with the pulse width or the pulse width modulation of the received signal. The output of the filter is applied to the intermediate frequency amplifiers of the radio frequency and intermediate frequency amplifiers of the receiver to ensure that the signals reaching the phase detector have uniform amplitude whereby operation of the envelope detector is made substantially independent of the amplitude of the received signal.

TIME DIVISION DUPLEX COMMUNICATION SYSTEM EMPLOYING A SINGLE CARRIER FREQUENCY

One of the advantages of the modulation and demodulation system provided by the invention is that it makes possible the transmission of up to six channels of information between two stations using a single radio frequency. It will be apparent from what has gone on before that it is necessary only to shorten the transmission time of the pulses from the several stations in this system without changing the time separation of successive pulses from an individual station. It is possible to recover all of the information that is sent from one station to another, notwithstanding that the time of actual transmission of data from one station to the other is as little as ⅛th of the total transmission time, providing that communication is divided over many small increments during that total time. That means that as many as eight different stations can communicate on a single radio carrier frequency if the stations operate in succession repetitively for very short intervals.

A block diagram of a transceiver useful in such a system is illustrated in FIG. 5. A diplexer 300 makes it possible to use a single antenna 302 for both transmitting and receiving. In the receive mode, signals pass from the antenna through the diplexer to a radio frequency amplifier 304. The amplified signals are delivered to a mixer 306 where they are heterodyned with a local oscillator signal that, in this embodiment, is developed by a master oscillator 308. The difference frequency resulting from the hetrodyning process is selected and supplied to the intermediate amplifier 312. The output of the intermediate amplifier is supplied directly to the envelope detector 314 and part of the output is supplied to the detector through a limiter 316. That limiter and envelope detector and the AGC filter 318 may be the same units that are shown in FIG. 4. The envelope detector provides a reconstruction of the transmitted envelope.

If the trailing edge of the pulse envelope reconstructed in the envelope detector 314 is unmodulated, it will constitute a time marker signal. In that event, an output from the envelope detector is applied to a terminal D. Terminal D is the source of time marker signals when the transceiver is used as a remote station, and is controlled by time marker signals transmitted from a base station or other source. When the transceiver shown in FIG. 5 is used as a base station, then time marker signals appear at terminal C.

Envelope detector output is also applied to a flip-flop unit 320 where the leading and trailing edge modulation is separated. The envelope may have modulation imposed on its leading edge, and that front edge modulation is recovered at the Q output of flip-flop 320. It is applied to a one-shot flip-flop 321 and then the output of the one-shot is delivered to a phase detector 322. That phase detector may, and in this case does, comprise an exclusive OR gate 330. The Q̄ output of the flip-flop 320 represents the trailing edge of the reconstructed envelope. It is applied to a one-shot flip-flop 323 and then to one input of the gate 330. A gating signal, which is a time marker signal derived from the master oscillator 308 and divided down in dividers 310 and 324, is applied to the other input of the exclusive OR gate 330. In FIG. 5, the connection to the divider is made through terminal C.

The output of the phase detector 322 is filtered in a low-pass filter unit 326, and the low frequency information, such, for example, as a voice signal, is applied to an analog data recovery unit 328 which may be an earphone or a speaker.

If the trailing edge of the pulse received by the transceiver of FIG. 5 is modulated in time with data information, that data is recovered at the output of the gate 330. The output of the gate is applied to a digital data recovery unit. That unit 332 is essentially a decoding apparatus. In one application of the invention, it compares the received data code with a code that is stored in an internal memory. The system includes a means to respond in one fashion if the codes match, and to respond in another fashion if they do not match.

The envelope detector 314 requires an input signal of uniform amplitude if the envelope is to be reproduced with a high degree of accuracy. However, that is easily accomplished by using automatic gain control techniques. A special technique for ensuring independence of the AGC voltage from pulse width change was described above. The output of the automatic gain control filter 318 is applied to both the radio frequency and the intermediate frequency amplifiers of the receiver.

The transmitter portion of the transceiver comprises a master oscillator 308 and various buffer and amplifier stages which are here represented by the single block 340. The master oscillator 308 provides time marker signals required to control and time a number of functions. For that reason, and also to achieve signal isolation, the oscillator frequency is selected to be something other than might be selected if the oscillator's only function was to generate the carrier signal. In this case, the output of the oscillator is supplied to a divider 310 and to a mixer 342 where the master oscillator signal and an output from the divider 310 are mixed to form the carrier signal, or a sub-multiple of it, to be multiplied in the frequency multiplier, buffer, final amplifier block 340.

The intelligence to be impressed on the carrier signal is added by pulsing the carrier and modulating the width of the pulses. The pulses are formed by keying the carrier on and off with a key signal that is supplied to the amplifier chain 340 through a key signal filter 350 from a modulator keyer unit 352. Unit 352 may be the same modulator unit that is depicted in FIG. 3. The box marked KEYER GATE 354 corresponds to the exclusive OR gate 23. The flip-flop 356 corresponds to flip-flop 20, flip-flop 358 corrdsponds to flip-flop 21. The front edge ramp generator is identified by the numeral 360 and the trailing edge ramp generator is designated 362. A switch 364 corresponds to switch 46. For the sake of simplicity, no switch corresponding to switch 60 is shown in FIG. 5. Instead, that switch is represented by indicating that the several units are connected either to the C or the D terminals whereby time marker signals are derived from the internal master oscillator or from the detected signal, respectively.

The output of the keyer is applied to the mixer and the radio frequency and the intermediate frequency amplifier stages so that the receiver will be turned off during intervals when the transmitter generates and transmits its pulse. Switching between the transmit and receive modes is accomplished so rapidly that there is a possibility that energy developed in the transmitter will find its way into the tuned circuits of the receiver and be stored momentarily as ringing energy in resonant circuits. If that energy continues to ring after the unit is switched to the receive mode, it can interfere with the received signal. That problem is solved in the invention by the use, in the receiver amplifier stages, of tuned amplifiers that have the configuration depicted in FIG. 6. Bias and other ancilliary circuitry has been omitted from that figure to facilitate understanding of its principle. Transistors 400 and 402 are connected as differential amplifiers. Their collectors are connected to opposite ends of a tank circuit comprising an inductor 404 and the series combination of capacitors 406 and 408 which are connected in parallel with the inductor. The emitters are connected to a common input point where the circuit is driven by a transistor 412 whose collector is connected to point 410 whose emitter is connected through a bias resistor 414 to ground, and which is driven by an input signal connected between the base and ground. Thus arranged, the circuit exhibits high Q but very low gain. The gain can be greatly increased, and the selectivity of the circuit can be improved, by driving the base of one of the transistors 400 and 402 in parallel with the input circuit of transistor 412. The base of transistor 402 is tied to negative potential. That circuit has general utility. In the transceiver of FIG. 5, it permits a very high order of amplification without the need to resort to extensive shielding. To turn the amplifier on and off, it is required only to bias transistor 412 to render it non-conducting. That can be done by applying a positive potential to terminal 416 which is connected through bias resistor 418 to the collector. Positive pulses are applied to terminal 416 from the keyer 354. Current flow in transistors 400 and 402 is turned off. What ever the condition in the tank circuit at the time, the current in the two halves of coil 404 will be equal and will buck one another so that "ringing" in the circuit is minimized.

The key filter 350 in FIG. 5 is a low pass filter whose function is to limit the range of frequencies in the pulse width modulation signal that is applied to the modulated stages in the transmitter amplifier 340. The effect of modulating pulse width is to generate a series of side bands spaced above and below the carrier, and from one another, by the pulse repetition rate frequency, here 3 kHz. The effect of changing pulse width, when viewed on a spectrum analyzer, is similar to the result produced in frequency or phase modulation. Modulation side bands appear around each of the side bands which results from the basic pulse modulation. When the change in width of the pulse represents a small fraction of the total pulse width, the effect is similar to very narrow band frequency modulation of the pulse rate side bands. The amplitude of the side bands produced by pulse width modulation varies above and below the carrier frequency to produce a series of lobes. Only the major lobe, of which the carrier frequency marks the center, is required for good fidelity signal transmission and recovery. The filter 350 is a low pass unit that eliminates harmonics of the modulation signal to prevent formation of side band lobes other than the major lobe. The effect is the same as would be produced by a very narrow and steep sided band pass filter operating at carrier frequency. In a representative system in which the pulse repetition rate is 3 kHz and in which one edge of the pulse is modulated with voice frequencies between 100 and 3000 cycles, and the other edge of the pulse is modulated with digital signals generated at a clock rate of 1 kHz, the band width of the major lobe is about 20 kHz or a band width of 100 microseconds.

CORDLESS TELEPHONE SYSTEM

The modulation and demodulation scheme herein described permits the transfer between stations of a security signal along with other information in the form of voice signals, sensor measurements, digital data, and other forms of variable information. The stations that are in communication with one another can be locked together in a sense by the security information link. In that link, one station sends time marker signals and the other station transmits identity information. It is necessary that the station that transmits the identity information be arranged so that it will not transmit its variable information in the absence of the time marker signal. And it is necessary that the station that sends the time marker signals not send that signal or any variable information in the absence of the identification signal from the receiving station.

In a communication system that involves a base station and a number of remote stations, security and privacy can be maintained by arranging each remote station so that it will demodulate incoming signals only if there is a carrier at the listening frequency, and if an identifying code which it recognizes has been transmitted to it. In the cordless telephone system depicted in FIGS. 7 and 8, a busy signal is generated and applied to the telephone earpiece in the remote station if an automatic gain control signal is developed in the receiver to indicate the presence of a carrier or a pulsed carrier which lacks modulation at the leading edge of the base station pulse of a code signal identifying that remote station. If the carrier signal and the code are received simultaneously at the remote station, a latch is tripped at the remote station so that its security code demodulator is converted to a security code encoder. That security code is applied to the pulses transmitted by the remote station as modulation of the pulse width at the trailing edge of the pulse. Upon receipt of that code signal at the base station, its security encoder is converted to a security decoder, and the security code must be received or the base station will cease transmitting. Thus it is that a busy signal can be generated at the remote station only before the communication link is received and no busy signal is received following establishment of the link notwithstanding that the base station stops transmitting the security code at the time the communication link is completed. That method of conducting the communication is useful in public safety communication systems as well as in cordless telephone communication systems. However, the latter application is less difficult to understand and has been so selected for illustration and description here. Having that understanding, artisans of ordinary skill will be able to apply the invention to the public safety application.

Figure 7:
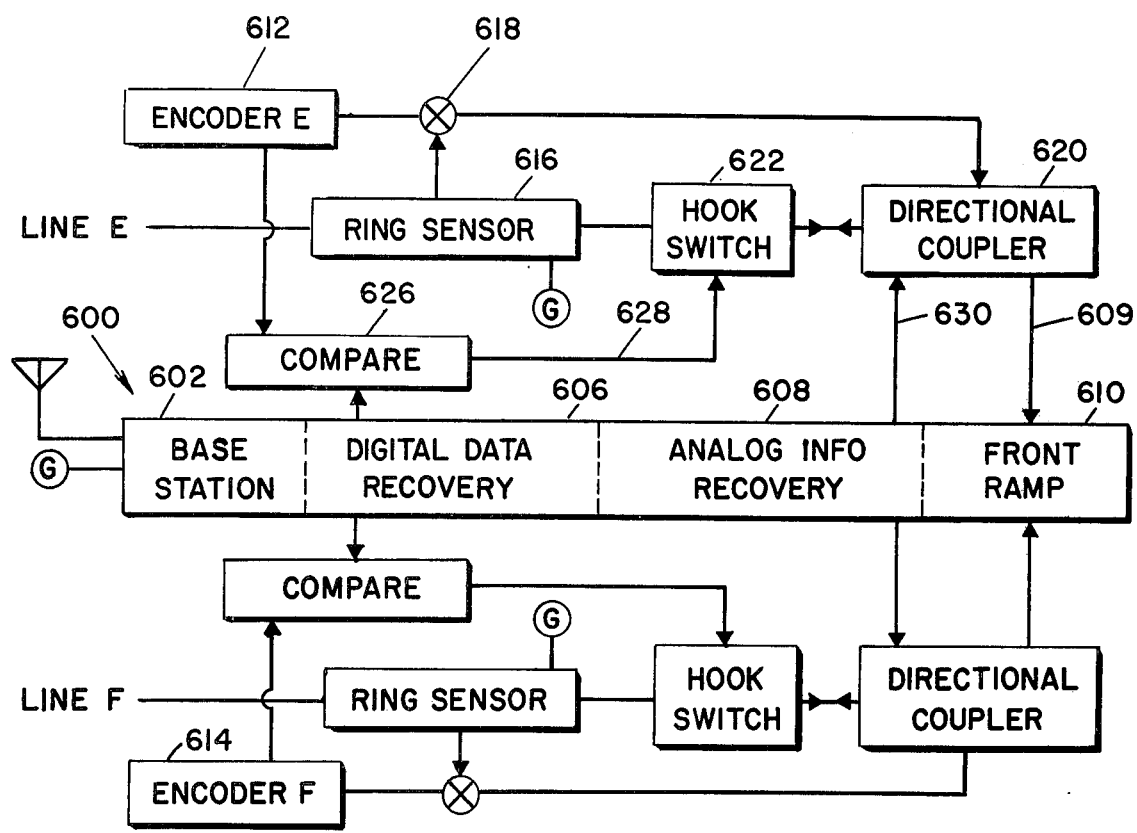
FIG. 7 is a diagram of a cordless telephone base station.
Figure 8:
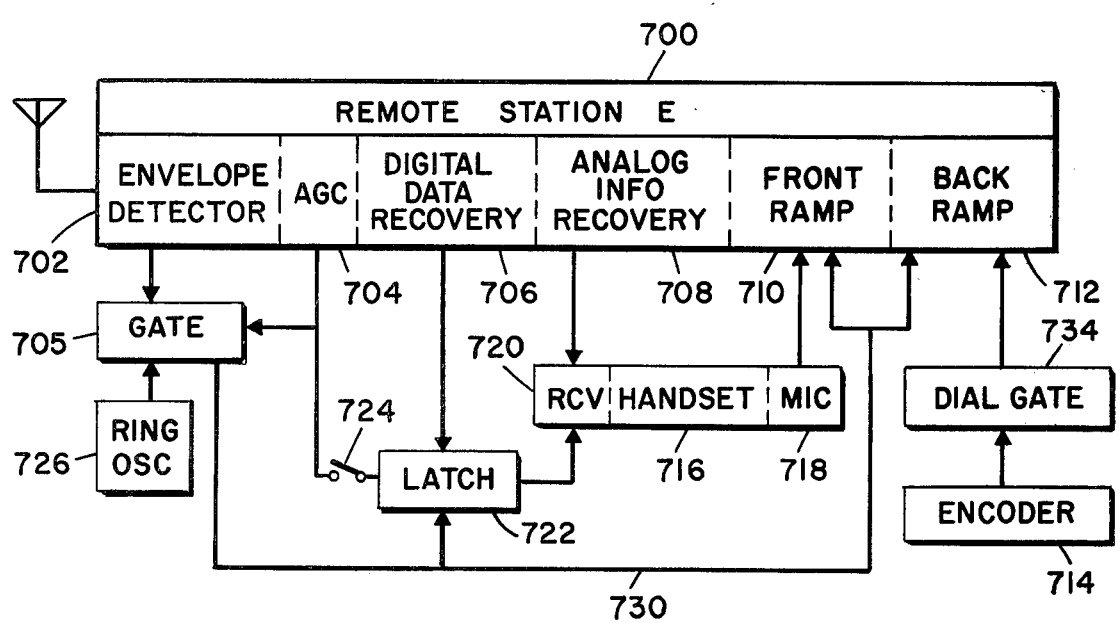
FIG. 8 is a diagram of a cordless telephone remote station.

FIGS. 7 and 8 depict a base station and one remote station of a telephone system in which a number of remote telephones, each having its own telephone number and each of which is associated with a separate telephone line, is placed in communication with that line by a single base station. In the example selected for illustration, the system comprises two remote, cordless telephones, each having its own telephone number. Remote telephone E is to receive calls that arrive on telephone line E and is to transmit outgoing messages on telephone line E. Remote telephone F is to receive and send calls on telephone line F. Those two telephone lines, E and F, are brought to a single base station and communication between the telephone line and the appropriate remote telephone is accomplished through that base station. Since the two remote stations are identical, except that they have different telephone numbers in the memory sections of their respective encoder and decoder units, only one of them need be shown in the drawing. Remote telephone E is shown in FIG. 8. FIG. 7 depicts the base station and its connection to telephone lines E and F. Remote unit F is not shown.

The telephone system has the following operating features:

(a) A ring signal on telephone line E will be transmitted by the base station together with a pulse modulated with a telephone number, or other identifying number, of remote telephone E;

(b) The ring signal on telephone line E will not be heard at remote telephone F;

(c) Upon lifting of its handset, or other actuation of its operating switches, remote station E will begin transmitting pulses modulated with its telephone number, or other identifying number, using time marker signals to control the timing of its listening and receiving sequences;

(d) Except that they listen and transmit alternately at the pulse repetition rate, the base station and the remote station E listen and transmit continuously for the duration of the communications link;

(e) During the period when the link between the base station and remote station E remains complete, lifting of the handset at remote station F will result in a busy signal at that handset;

(f) An outgoing telephone call can be initiated from either remote handset if the handset is lifted at a time when no carrier signal is being transmitted from another unit of the system and is being received at the station at which the handset was lifted;

(g) The remote stations include a means for generating time marker signals in the event that time marker signals are not being received from the base station as when a call is initiated at the remote station;

(h) The remote stations are arranged so that they will stop generating time marker signals upon receiving a carrier signal modulated to include the telephone number, or other identifying number, of that remote station.

In FIG. 8, the base station is generally designated 600. It includes the transceiver depicted in FIG. 5. That transceiver is shown as a block in FIG. 8, identified by the numeral 602. Because they will be referred to below, the block is divided into a digital data recovery section 606, an analog data recovery section 608, and that portion of the modulator which accounts for modulation of the leading edge of the base station output pulse. That section is labelled "FRONT RAMP" and is numbered 610.

In a practical system, the generation and the recognition of the identifying digital codes can be accomplished in the same structure. However, for the sake of clarity, those structures are shown separately in FIGS. 5 and 8. Thus, in FIG. 5, the box marked "DIGITAL DATA RECOVERY" 320 may designate the same apparatus that generates the code signal that is applied to the back ramp modulation unit shown as box 380 of FIG. 5, and it may be the same apparatus that is designated by box 382 in FIG. 5 and supplies identifying information to the front ramp modulator. In FIG. 8, the apparatus that accomplishes digital data recovery in box 606 may be the same apparatus in box 612 marked "ENCODER E," and it may be the same apparatus in box 614 marked "ENCODER F."

In addition to the transceiver 602 and encoders 612 and 614, the base station includes incoming telephone line E which is applied to a ring sensor 616 the primary output of which is used to actuate a switch 618 by which encoder E is made to apply coded signals to a directional coupler 620. Another output at G turns on the transceiver, if not already turned on. The output of the directional coupler is used to modulate the forward edge of pulse signals that are generated in the base station. To that end the output of the directional coupler on line 609 is applied to control the front ramp 610 of the modulator. Thus arranged, the base unit transmits signals during intervals when the ring signal is present on telephone line E. During that interval the base station transmits a pulse train and the front edge of the pulses are modulated in width with the identification code of remote station E. The base station continues to operate in the manner thus described until ring signals are no longer received, as when the caller hangs up, or until the handset at remote station E is lifted. When that handset is lifted, remote station transmits a signal in the form of pulses sandwiched between the pulses transmitted by the base station. One edge of those pulses is modulated by a code signal which describes the telephone number, or other identifying number, of remote station E. The pulses thus modulated are received at the base station where they are demodulated and the digital data is recovered in section 606 of the base station transceiver. That information is applied to a comparison unit which compares the received digital data with the data in the memory unit in encoder E. If the codes compare, then an output is delivered from the comparison unit 626 by line 628 to a hook switch relay which closes the hook switch 622 to complete a connection from line E to the directional coupler. The telephone system includes apparatus for detecting that the hook switch has been closed, and that apparatus is effective to discontinue ring signals.

If the remote station E ceases transmission of its identifying code, the output of the digital data recovery unit 606 in the base station would go to zero. There would be no output from the compare unit 626 and the hook switch relay would be de-energized to disconnect the hook switch.

A similar encoder, ring sensor, comparator, hook switch, and directional coupler are associated with incoming telephone line F. They operate in the same manner as do the corresponding units associated with line E.

FIG. 8 is a block diagram of a remote station. In this case, remote station E. It includes a transceiver of the kind depicted in FIG. 5 as represented by the block 700 in FIG. 8. It includes an envelope detector 702, a circuit for generating automatic gain control signals 704, a digital data recovery section 706, an analog information recovery section 708, a front ramp section 710 of the modulator, and the back ramp section 712 of the modulator. As before, the encoder function is shown separately from the digital data recovery section. It is represented by a box numbered 714. It is connected to the modulator through a ring gate 314. The unit also includes a handset 716 which contains a microphone 718 and an earphone, or speaker, 720. It includes a flip-flop connected as a latch and designated by the reference numeral 722. A switch 724 is closed during periods when the remote station is to listen for telephone rings, and is open during periods when the remote station is to transmit. The unit also includes a three input gate 705 one of whose inputs is taken from that output of the envelope detector 702 which marks the front edge of a received pulse. A second output is taken from the AGC filter 704. The third input of the gate is taken from a ring oscillator 726 whose frequency is something other than the pulse repetition rate frequency when controlled by time marker signals from the base station. Thus, for example, the ring oscillator may generate signals at 2 kHz when the marker signals furnished by the master oscillator occur at a 3 kHz rate.

The ring oscillator performs two functions. It furnishes pulse repetition rate signals when a telephone call is initiated from the remote station and no time marker signals are being received from the base station. Further, the ring oscillator applies an audio signal to the earphone or speaker of the handset in the event that the handset is lifted when a carrier of proper frequency is received to develop an AGC voltage, but when that carrier lacks an identifying code signal identifying station E.

The switch 724 may be actuated independently of handset movement or may be coordinated with handset movement. In any event, that switch is open when transmitting and closed when listening. When a telephone call is to be initiated from the remote station, switch 724 is opened. In the absence of an output from envelope detector 702, the ring oscillator output signal passes through gate 705 and by line 730 to the back ramp generator 712 and front ramp generator 710.

There are several conditions to examine in understanding system operation.
(1) Call initiated from third party on line E or F for remote station E or F:
  (a) Base station not busy;
  (b) Base station is busy;
  (c) Remote station phone off hook.
(2) Call initiated from another remote:
  (a) When no other station is busy;
  (b) When another remote station has phone off hook.

In case 1a, as described in part above, an incoming call on one line, line E for example, begins with a ring signal of alternating current. The signal lasts for a period that varies from one telephone company to another, but is often about one-half second long. For that one-half second period the alternating ring voltage is used to turn on the base station transceiver and to connect the encoder of code E to a directional coupler from whence it is applied to modulate the front or leading edges of the pulses that are formed to key the base station transmitter on and off. If the pulse repetition rate is 3 kHz as previously assumed and the pulse duty cycle approaches fifty percent, a number of pulses approaching 1500 pulses is transmitted during the time of an incoming ring signal. The encoders E and F may be, and, in this case, they are, gated by time marker signals so that the leading edge of each keying pulse is modulated by one bit of the identification code. If the code is twenty bits long it will be repeated dozens of times during each telephone ring.

At station E, where the handset is down, or "on hook" (switch 724 in closed position), the incoming signal results in development of an AGC voltage which is applied to a ring signal oscillator gate 705. The AGC signal is also applied to latch 722. The output of the ring oscillator will pass through gate 705 if AGC voltage is applied to the gate to and through latch 722 to the handset earpiece. There is another disable input to the latch and it is connected to the digital data recovery portion 706 of the remote transceiver. The latch will be disabled so that the ring signal will not reach the handset receiver unless the code being transmitted from the base station matches the station E identifying code.

If the remote station developes AVC voltage and recognition of the code, the output of the ring oscillator will be heard at the earpiece even if, and, in fact, only if, the handset is "down." If no one picks up the remote handset is will continue to ring each time a ring signal appears on line E. If the caller hangs up or the time at the telephone company times "out," the ring signals at the line E, and, therefor, at remote station E, will cease.

If a ring is applied to line E at a time when the base station is busy in that it is transmitting to remote station F, the encoder E will be disabled and code E will not be transmitted.

If the remote station E handset is picked up, its encoder will be switched from encode and back again to decoder by time marker signals being sent from the base station. When connected as an encoder, it modulates the the back ramp voltage and the trailing edge of the remote station keying pulse. If it is picked up during the interval between base station pulses, operation for an instant will be based on time markers generated in the remote station as in the case where calls are originated from the base station. That is explained below.

If the remote handset is picked up at a time when a pulse is being received from the base station, timing will be controlled by the trailing edge of the base station information pulse as that edge is used to generate the marker signals applied to the modulator and demodulator gates. The remote unit will automatically send pulses the trailing edges of which are modulated with the station E identification code. Upon receipt of remote unit signals, the base station reproduces the envelope of those signals, demodulates the digital code signals, and compares them with the code in the encoder E and encoder F units. Since the received code matches the stored E code in the compare unit 616, a signal is supplied to "lift", or close, the hook switch. The telephone company's equipment responds by terminating ring signals so switch 618 remains open. Only the callers voice signals reach the directional coupler for delivery to the forward edge modulator. The coupler receives demodulated voice signals from the base unit receiver and applies them to the telephone line E.

If the caller "hangs up" before the remote station user hangs up, the telephone company applies a dial tone to the line and that will be received by the remote station just as any other incoming audio signal. When the remote station user hangs up its handset, the remote unit stops sending its identification code. Comparison is lost at the comparator 626 and hook switch for line E is opened.

Figure 9:
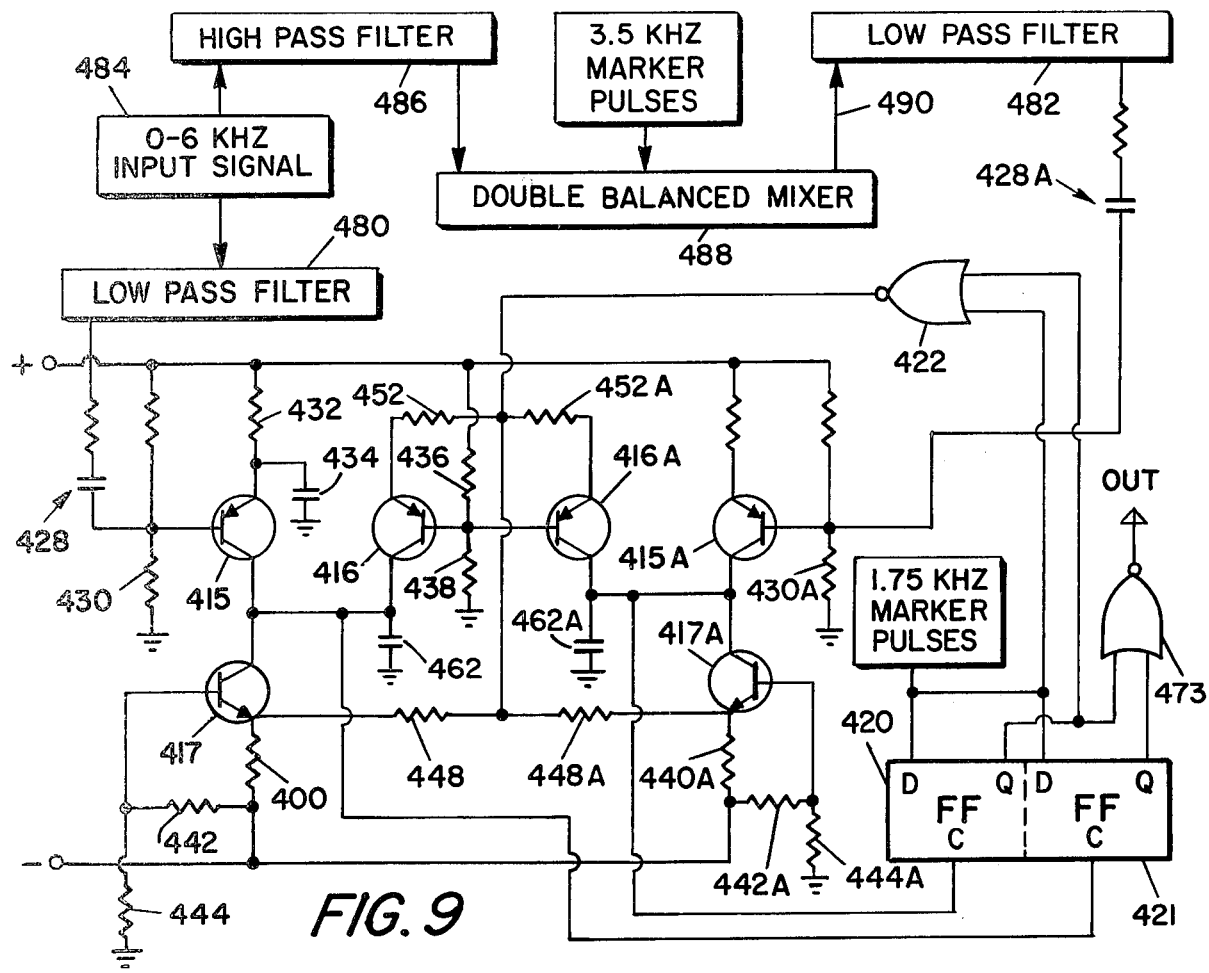
FIG. 9 is a diagram, partly in block form of a pulse modulator in which voice signals modulate both the leading and trailing edges of pulses.

In case 1b, the base station is busy when a call is received. For example, if the base station is in communication with remote station F when a ring signal appears on line E, and if the base unit can communicate with only one remote unit at a time, then the system might respond to let the line E caller know that the line was busy by applying a busy signal. However, that would suggest that someone is available to operate the station E phone and that that someone is engaged in a telephone conversation. To simply let the ring signal continue would imply that no one is available at station E to receive a call. That may not be true either. In the diagrams of FIGS. 8 and 9, there would be no busy signal. Use of one encoder renders the other inoperative because, in practice, they are the same unit. Thus, no code E signal is furnished to the directional coupler. No code E signal is received at remote unit E so that unit does not transmit or even receive any signal at the earpiece because latch 722 is disabled.

The case 1c describes the situation in which the remote station has its phone "off hook," or lifted at the time when a call or ring signal is received at one line at the base station. If the remote is off hook, it will be transmitting code signals to the base station which will recognize the code, will be turned on, and will transmit time marker signals to complete the link. If the call is received on the line corresponding to the remote station that is on the air, the equipment at the telephone company central office will sense the off hook condition and will send a busy signal to the caller. If the call is for the other remote station, it will be received on the other line where the encoder is inactivated so the hook switch there will not be operated.

In case 2a, the remote station E handset is lifted. Switch 724 is opened. The base station is turned off, but listening. The remote station user expects to hear a dial tone when he lifts the handset and that will happen because lifting the handset activates the remote transmitter. Its signals are coded and are received at the base station, and are compared with the code stored in encoders E and F. Since the code will match code E, the compare unit will activate the line E hook switch. That connects the base station modulator to the telephone line through the line E coupler. The base station transmits the dial tone to the remote unit. The remote user may then dial the number to be called. The dial gate 734 switches modulation from encoder 714 on and off as the dial is rotated. That results in intermittant signal transmission to the base unit and, as a consequence, signals are applied intermittantly to the telephone line E through the directional coupler and hook switch and sign sensor. A time delay circuit in the comparators prevents hang up of the hook switch notwithstanding that the identification code is interrupted by the dial gate.

However, if the remote station E handset is lifted while station F is in communication with the base station, only a busy signal is heard at the remote handset. In that case, there will be an AGC voltage to permit the ring oscillator gate to pass ring oscillator signals to the latch. Since the base station is sending the F code there will be no recognition and the latch 722 will be set to apply the ring oscillator tone to the handset. That is the busy signal.

The embodiment of the invention that is depicted in FIG. 9 illustrates that it is possible, within the invention, to produce a modulator which forms both the leading edge and the trailing edge of pulses at a time, relative to the marker time, that is a function of the amplitude of analog signals. That differs from the embodiment shown in previous figures in which the trailing edge was formed as a function of a digital signal.

The circuitry shown in FIG. 5 is conveniently understood by referring to the description of FIG. 3. The left portion of FIG. 9 corresponds to what is shown in the left portion of FIG. 3, and it operates in the same manner. The elements of FIG. 9 that correspond to FIG. 3 have been given the numeral designators four hundred higher than those of FIG. 3. In the case of FIG. 9, the input signal to that portion of the modulator is derived from a low-pass filter 480 rather than from the microphone shown in FIG. 3. As in the case of FIG. 3, the output from the right-hand portion of FIG. 9 is connected to the clear input terminal C of flip-flop 421 which corresponds to flip-flop 21 of FIG. 3.

That same circuit is duplicated in the lower central portion of FIG. 9 where the several components have been given numerals four hundred greater than those of the corresponding elements of FIG. 3 and are followed by the letter A. The input to that circuit is supplied from a low-pass filter 482 through the input network 482a. The output of that section of the modulator is applied to the clear input of flip-flop 420. Marker pulses are applied to the D inputs of the two flip-flops at the pulse repetition rate and to the NOR gate 422 which provides slope initiating signal to the modulators. NOR gate 473 corresponds to NOR gate 73 of FIG. 3. The Q terminals of the flip-flops are connected to that gate to provide a succession of output pulses the forward edge of which is modulated by flip-flop 421 and the trailing edge of which is modulated by flip-flop 420.

Thus it is that the modulator circuit of FIG. 9 simply comprises two of the analog modulator sections of FIG. 3. The apparatus that is represented in block form in the upper portion of FIG. 9 has been added to illustrate how it is possible to modulate pulse width to represent a band of frequencies which exceeds the pulse repetition rate. Block 484 represents a microphone or other apparatus in which signals are generated in the audio range from 0 to 6 kHz. A portion of that signal is supplied to low-pass filter 480 from whence it is applied to input network 428 of the modulator. In preferred form, the low-pass filter would have a high frequency roll-off at approximately 3 kHz.

Some of the 0 to 6 kHz input signal is applied to high-pass filter 486 which, in preferred form, has a low frequency roll-off at about 3 kHz. After passing through the high-pass filter, the high frequency components of the input signal are applied to a double balanced mixer 488 along with 3.5 kHz marker pulses. The output of the double balanced mixer is applied by line 490 to the low-pass filter 482 whose output is applied to the input network 428a of the trailing edge analog modulator. The output of the double balanced mixer is a signal whose frequency is the distance between the input from the high-pass filter and the 3.5 kHz marker pulse. That difference frequency has a value below 3.5 kHz so that it is a low-pass filter that is required at unit 482.

Because of the output of the low-pass filter being a difference frequency, it has the same effect in altering the trailing edge of the modulator output pulses as it would have at higher frequency, notwithstanding that the modulating signal is in the lower frequency range.

Thus it is that output pulses occurring at 1.75 kHz are modulated to include information that appears as an input signal whose frequency varies from 0 to 6 kHz.

Figure 10:
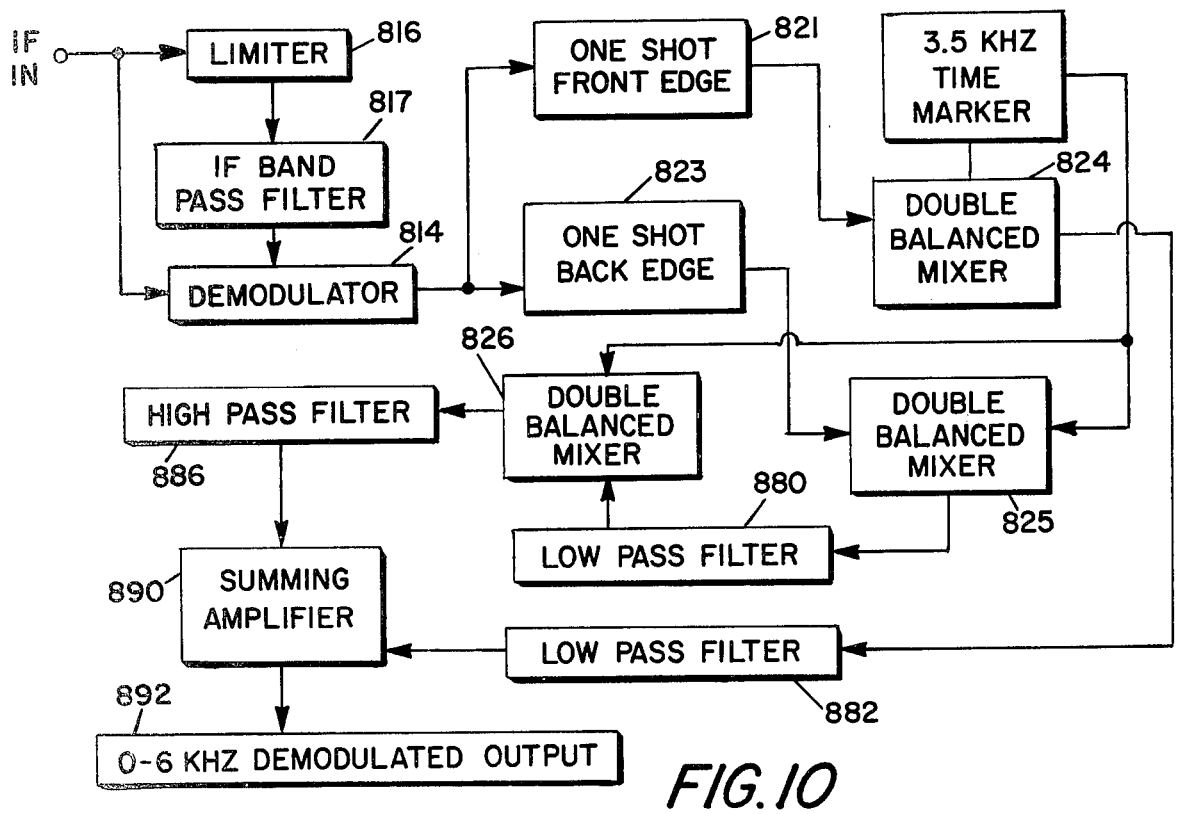
FIG. 10 is a diagram of a demodulator suitable for demodulating the output of the modulator illustrated in FIG. 9.

FIG. 10 is a diagram of a demodulator. The elements of the demodulator are shown in block diagram form because they correspond to elements previously described. the limiter 816 corresponds to limiter 316 in FIG. 5. The IF band pass filter 817 is a conventional filter, and the modulator 814 corresponds to the envelope detector 314 of FIG. 5. One-shot 821 is triggered on the leading edge of the input pulse and it corresponds to flip-flop 321 of FIG. 5. The other one-shot multivibrator 823 triggers on the trailing edge of the demodulated pulse and it corresponds to flip-flop 323 of FIG. 5. The double balanced mixers 824, 825, and 826 are conventional structures and need comprise no more than an exclusive OR gate. Low-pass filters 880 and 882 are similar to the low-pass filters of FIG. 9. High-pass filter 886 is similar to the high-pass filter 486 of FIG. 9. The summing amplifier 890 is an amplifier arranged to add the outputs of high-pass filter 886 and of low-pass filter 882.

The diagram of FIG. 10 assumes that signals in the form of pulses, both the leading and trailing edge of which have been modulated in the manner described in connection with FIG. 9, have been received and detected and heterodyned with the local oscillator signal so that they are reduced to an intermediate frequency signal in pulse form. That signal is applied to the terminal marked IF IN. It is applied simultaneously to a limiter 816 and demodulator 814, and the output of the limiter is applied to the demodulator in the manner described in connection with FIG. 5, except that in this case the limiter output is passed through an IF band pass filter, unit 817. The output of the demodulator 814 is a reconstructed pulse which is applied to the one-shot multi-vibrators 821 and 823. One-shot multi-vibrator 821 responds to the leading edge of the demodulated pulse to develop a pulse which is applied to double balanced mixer 824 along with 3.5 kHz time marker pulses. It is assumed that the input signal to FIG. 10 corresponds to the output signal of FIG. 9 in that it comprises pulses at the rate of 1.75 kHz which are modulated to include intelligence at 0 to 6 kHz. Thus, the time marker signal provides two markers, one that can be related to the beginning and one that can be related to the end of the demodulated pulse. The output of the double balanced mixer 824 is a difference signal that is applied to low-pass filter 882.

The demodulated signal is also applied from the demodulator 814 to one-shot multi-vibrator 823 which provides a pulse that begins at the trailing edge of the demodulated pulse. The output of unit 823 is applied to a double balanced mixer 825 along with a 3.5 kHz time marker signal. The output of double balanced modulator 825 is a difference signal which is applied to low-pass filter 880. The output of the low-pass filter is a difference signal. The original is recovered by applying that signal to double balanced mixer 826 along with 3.5 kHz time marker signals. The output corresponds to the original signal and is applied to high-pass filter 886. The output of that high-pass filter and of the low-pass filter 882 are applied together to the summing amplifier 890 where they are added so that the output which appears at block 892 is an analog signal in the range 0 to 6 kHz which corresponds, in this example, to the 0 to 6 kHz input signal of FIG. 9.

Two embodiments of the invention have been described. In one, the leading edge of transmitted pulses was modulated with an analog signal, and the trailing edge of those pulses was modulated with a digital signal. The second embodiment illustrated that the analog modulation portion of the modulator need only be produced and furnished with an analog signal to permit modulation of both edges of transmitted pulses to be modulated with analog signals.

The explanation of those two embodiments having been made, it will become apparent that the invention is applicable as well to systems in which both edges of transmitted pulses are modulated with digital information.

Although I have shown and described certain specific embodiments of my invention, I am fully aware that many modifications thereof are possible. My invention, therefore, is not to be restricted except insofar as is necessitated by the prior art.

I claim:

1. The method of conducting two-way communication of intelligence between two stations only when the link between them remains established which method comprises the steps of:

transmitting a series of time marker signals from a first of those stations to the second;

transmitting a series of identifying signals from the second station to the first having a given time relation to said time marker signals;

transmitting intelligence signals having a given relation to said time marker signals between said stations while transmitting marker and identifying signals;

terminating transmission of intelligence signals at said first station in the event that identifying signals having the given relation to said time marker signals are not received at said first station and terminating transmission of intelligence signals at said second station in the event that time marker signals are not received there.

2. The method defined in claim 1 which includes the step of utilizing initiating signals derived from said time marker signals for initiating generation of said intelligence signals.

3. The method defined in claim 2 in which sid intelligence signals are formed as pulses and in which said time marker signals comprises one edge of the pulse transmitted by said first station.

4. The method defined in claim 3 in which said pulses are formed as bursts of radio frequency energy, the pulses from the first and second stations being transmitted alternately and comprising bursts at a common radio frequency.

5. The method of pulse width modulation which comprises the steps of:
providing a succession of time marker signals;
initiating formation of first and second ramp wave forms at times having a predetermined relation to said time marker signals such that the first ramp form reaches a first given value and such that the second ramp form reaches a second given value at a time following the time at which said first given ramp form reaches said first given value;
transmitting a signal in the interval between said time at which the first ramp form reaches said first given value and the time that said second ramp form reaches said second given value; and
altering the slope of at least one of said ramp forms in accordance with some intelligence whereby duration of said interval is altered.

6. The invention defined in claim 5 in which said generation of both of said ramp forms is initiated at the same time.

7. The invention defined in claim 5 in which a start signal and a stop signal are generated at the time when said first ramp form and said second ramp form reach said first and second values, respectively.

8. The invention defined in claim 7 which comprises the further step of utilizing said start signal and said stop signal to key a radio frequency carrier wave on and off.

9. The invention defined in claim 8 in which stop and start signals are provided successively whereby there is produced a succession of bursts of radio frequency energy the time width of which is modulated in accordance with the degree in which the slope of said one ramp form is altered.

10. The invention defined in claim 9 which comprises the further step of modulating the time width of said bursts of energy to represent a digital code by altering the slope of one of the ramp forms such that the slope has one value to represent a zero and another value to represent a one.

11. The invention defined in claim 10 in which each burst of a series of bursts of energy is modulated in time width to represent one, respectively associated, bit of a series of bits representing a code.

12. The method of demodulating a series of pulses of radio frequency energy modulated in time width which comprises the steps of:
finding the times at which the trailing edge of each pulse is reduced to a given amplitude;
finding the time at which the leading edge of each pulse is increased to a given amplitude;
producing a succession of time marker signals having a predefined time spacing between successive signals at the repetition rate of said pulses;
providing signals one characteristic of which is variable as a function of the interval between occurrence of said marker signals and the times when the leading and trailing edges of said pulses reach said given amplitudes;
causing said pulses of radio frequency energy to generate automatic gain control signals the magnitude of which varies with the amplitude of said pulses when received and does not vary with the duration of individual pulses; and
using said automatic gain control signals to alter the amplitude of said radio frequency energy pulses.

13. An amplifier circuit comprising:
a tuned circuit;
a pair of transistors having their respective collector current carrying circuits connected in parallel between a common energy source connection and opposite ends of said tuned circuit;
a third transistor having its collector current carrying circuit connected in series with said common energy source connection;
each of said transistors comprising a control element effective in response to applied voltages to control current flow in its respective controlled current carrying circuit; and
means for applying an input signal to one of said pair of transistors and to said third transistor simultaneously;
the control element of the other of those transistors being maintained at uniform potential.

14. The invention defined in claim 13 in which said tuned circuit comprises a center tapped coil and a capacitive reactance element connected in parallel with one another, the controlled current carrying circuit of each transistor comprising its collector-emitter circuit; and
the centertap of said coil forming a second common connection for connection to an energy source.

15. The invention defined in claim 14 in which said means for applying an input signal comprises means for applying an input signal having substantially a given frequency and in which said tuned circuit is tuned to substantially that same given frequency.

16. In combination:
generator means for generating first ramp shaped wave forms;
means for detecting when each of said first ramp shaped wave forms has a given value;
means for altering one of said given value and the slope of said ramp form as a function of the value of a modulating signal;
means for generating second ramp shaped wave form;
means for detecting when each of said second ramp shaped wave forms has a given value;
means for altering, as a function of a second modulating signal, one of said given values of the second ramp shaped wave form and its slope; and
means for generating time marker signals;
the wave forms of one of said first and said second ramp shaped wave forms having a slope greater than the other, the wave forms of both ramp shaped wave forms being initiated at a time having a predetermined relation to said marker signals.

17. The invention defined in claim 16 which further comprises:
means for receiving bursts of radio frequency energy;
detecting means for detecting the time, and providing a first signal when a burst first reaches a given amplitude; and
means for detecting the time, and providing a second signal, when the amplitude of a burst first falls to a given amplitude.

18. The invention defined in claim 16 in which said first and said second modulating signals are analog signals.

19. The invention defined in claim 18 in which at least one of said first and said second modulating signals is a digital signal.

20. In combination:
generator means for generating first ramp shaped wave forms;
means for detecting when each of said first ramp shaped wave forms has a given value;
means for altering one of said given value and the slope of said ramp form as a function of the value of a modulating signal;
means for generating time marker signals;
means for initiating generation of said first ramp shaped wave form at a time having a predetermined relation to said time marker signals;
means for generating a radio frequency carrier signal;
means responsive to detection of the time when each of said first ramp shaped wave forms has said given value for determining one edge of a burst of said radio frequency carrier signal;
means for receiving bursts of radio frequency energy;
detecting means for detecting the time, and providing a first signal when a burst first reaches a given amplitude;
means for detecting the time, and providing a second signal, when the amplitude of a burst first falls to a given amplitude;
said detecting means comprising a ring demodulator having first and second current inlets, the inlet currents of which have a given ratio at zero input signal and the first of which decreases, and the second of which increases, with increasing input signal;
first and second current sources connected to supply current in a constant ratio of currents;
the first current source being connected to supply a current less than zero signal current to said first inlet and said second current source being connected to supply more than zero signal current to said second inlet; and
means responsive to reduction of input current to said first inlet to a value below that supplied by said first source to provide one signal and means responsive to increase of input to said second inlet to a value above that supplied by said second course to provide a second signal.

21. The invention defined in claim 20 which further comprises a set/reset flip-flop and means for applying said signals to a respectively associated one of the set and reset terminals of said flip-flop.

22. In combination:
means for receiving bursts of radio frequency energy;
detecting means for detecting the time, and providing a first signal when a burst first reaches a given amplitude;
means for detecting the time, and providing a second signal, when the amplitude of a burst first falls to a given amplitude;
said detecting means comprising a ring demodulator having first and second current inlet ports the inlet currents of which have a given ratio at zero input signal and the first of which decreases, and the second of which increases, with increasing input signal;
first and second current sources connected to supply current in a constant ratio of currents;
the first current source being connected to supply a current less than zero signal current to said first inlet port and said second current source being connected to supply more than zero signal current to said second port; and
means responsive to reduction of input current to said first port to a value below that supplied by said first source to provide one signal and means responsive to increase of input to said second port to a value above that supplied by said second course to provide a second signal.

23. A demodulator of pulses whose leading and trailing edge have been formed at a time, relative to a reference time, that represents some intelligence, said demodulator comprising:
(a) means for forming a rising signal and a falling signal at a time corresponding to the leading edge and the trailing edge of a pulse to be demodulated;
(b) first and second pulse forming devices, one responsive to said rising signal rising to a given level to form a first pulse and the other responsive to said falling signal falling to a given level to form a second pulse; and
(c) means for comparing the time of occurrence of said first and second pulses with said reference time.

24. The method of communicating between two stations at least one of which has an identity by alternately sending pulses of energy from each of them to the other, which method comprises the steps of:
(a) generating and transmitting from a first one of said stations a succession of pulses each having a leading edge and a trailing edge, one of which edges being unmodulated and the other of which is modulated by causing its time of occurrence to vary, in accordance with some intelligence, from some given time interval measured from the time of said one edge of the pulse;
(b) receiving said succession of pulses at the second one of said stations and demodulating the pulses by measuring the variation in the duration of said pulses from said given interval;
(c) generating and transmitting from said second station a succession of pulses each having a leading and a trailing edge the time of occurrence of both of which edges is variable relative to said one edge of the pulses transmitted by said first station, and each occuring in the interval between receipt at said second station of successive pulses from said first station.

25. The method defined in claim 24 which includes the further step of receiving the pulses transmitted from the second station at said first station and there decoding them by determining the time variation in the occurrence of both edges of said pulses from said second station relative to the time of occurrence of said one edge of the pulses generated at said first station.

26. The invention defined in claim 25 which comprises the further steps of:
causing said other edge of the pulses generated by said second station to be modulated according to an identity code; and
causing said first station to demodulate said identity code, compare said code with its identity and generate and transmit its pulses only if the code matches its identity.

27. The invention defined in claim 25 which comprises the further step of causing one edge of the pulses generated and transmitted by said second station to be modulated in accordance with the identity of said second station; and
causing said first station to cease generating and transmitting pulses when it ceases to receive pulses modulated in accordance with the identity of said second station.

* * * * *